United States Patent [19]

Carey et al.

[11] Patent Number: 5,708,108

[45] Date of Patent: Jan. 13, 1998

[54] WATER TREATMENT POLYMER CONTAINING POLY[OXY-[(HYDROXYMETHYL)-1,2-ETHANEDIYL]] MACROMONOMERS AND METHODS OF USE THEREOF

[75] Inventors: William S. Carey, Ridley Park; Andrew Solov, Holland, both of Pa.

[73] Assignee: BetzDearborn Inc., Trevose, Pa.

[21] Appl. No.: 642,835

[22] Filed: May 3, 1996

Related U.S. Application Data

[62] Division of Ser. No. 426,516, Apr. 21, 1995, Pat. No. 5,601,754.

[51] Int. Cl.[6] ............................. C09K 3/00; C23F 11/00; C02F 1/00; C08F 236/00
[52] U.S. Cl. ................ 526/287; 252/180; 252/389.62; 252/392; 252/396; 210/701; 422/12; 422/13; 422/14; 422/16; 525/329.4; 525/329.7; 525/330.1; 525/330.3; 528/75; 528/176; 526/287
[58] Field of Search .................... 525/329.4, 329.7, 525/330.1, 330.3; 528/75, 176; 252/389.62, 396, 392, 180; 422/12, 13, 14, 16; 210/701; 526/287

[56] References Cited

U.S. PATENT DOCUMENTS

| | | | |
|---|---|---|---|
| 4,560,481 | 12/1985 | Hollander | 252/395 |
| 4,659,481 | 4/1987 | Chen | 210/697 |
| 4,659,482 | 4/1987 | Chen | 210/701 |
| 4,701,262 | 10/1987 | Chen | 210/701 |
| 4,732,698 | 3/1988 | Chen | 252/180 |
| 4,759,851 | 7/1988 | Chen | 210/701 |
| 4,801,387 | 1/1989 | Chen | 210/701 |
| 4,869,827 | 9/1989 | Chognard et al. | 210/701 |
| 4,869,845 | 9/1989 | Chen | 210/180 |
| 4,872,995 | 10/1989 | Chen et al. | 210/701 |
| 4,895,663 | 1/1990 | Chen | 210/701 |
| 4,895,664 | 1/1990 | Chen | 210/701 |
| 4,913,822 | 4/1990 | Chen et al. | 210/699 |
| 4,931,188 | 6/1990 | Chen | 210/701 |
| 4,944,885 | 7/1990 | Chen | 210/701 |
| 5,062,962 | 11/1991 | Brown et al. | 210/698 |
| 5,128,427 | 7/1992 | Chen | 526/240 |
| 5,169,537 | 12/1992 | Chen | 210/701 |
| 5,180,498 | 1/1993 | Chen et al. | 210/697 |
| 5,242,599 | 9/1993 | Chen et al. | 210/701 |
| 5,271,847 | 12/1993 | Chen et al. | 210/701 |
| 5,282,976 | 2/1994 | Yeung | 210/697 |
| 5,298,570 | 3/1994 | Tahara et al. | 525/329.7 |
| 5,437,712 | 8/1995 | Klatskin | 95/234 |
| 5,445,758 | 8/1995 | Chen et al. | 252/180 |

OTHER PUBLICATIONS

Betz Handbook, 8th ed., pp. 85–96. (1980).
Chem Abst. 90:39553r.

*Primary Examiner*—Sharon Gibson
*Assistant Examiner*—Deanna Baxam
*Attorney, Agent, or Firm*—Alexander D. Ricci; Steven D. Boyd

[57] ABSTRACT

A polymer and method of controlling corrosion and the formation and deposition of scale imparting compounds in water systems is disclosed. The polymer has the general structure:

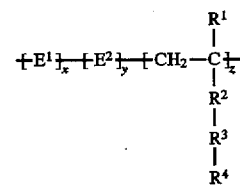

wherein $E^1$ comprises the repeat unit obtained after polymerization an $\alpha,\beta$ ethylenically unsaturated carboxylic acid monomers, lower alkyl ($C_1$–$C_6$) ester or a hydroxylated lower alkyl ($C_1$–$C_6$) ester of such carboxylic acid, or amide forms thereof; $E^2$ comprises the repeat unit obtained after polymerization of an $\alpha,\beta$ ethylenically unsaturated monomer containing a sulfonic acid functionality; $R^1$ is a hydrogen or a lower ($C_1$–$C_3$) alkyl; $R^2$ is $-CH_2-O-$ or $-C(=O)-O-$; $R^3$ is $-[-CH_2-CH(-CH_2-OH)-O-]-_n$; n is an integer greater than 1; and $R^4$ is hydrogen, or C1–C20 alkyl; and x is the molar percentage being between 1–98 molar %, y is the molar percentage being between 1–98 molar %, z is the molar percentage being between 98–1 molar %, wherein the sum of x, y and z equal 100%.

This polymer may also be used in concert with topping agents.

3 Claims, No Drawings

WATER TREATMENT POLYMER CONTAINING POLY[OXY-[(HYDROXYMETHYL)-1,2-ETHANEDIYL]] MACROMONOMERS AND METHODS OF USE THEREOF

This is a divisional of application Ser. No. 08/426,516 filed Apr. 21, 1995 now issued as U.S. Pat. No. 5,601,754.

FIELD OF THE INVENTION

The present invention relates to a composition and method of inhibiting corrosion and controlling the formation and deposition of scale imparting compounds in water systems such as cooling, boiler and gas scrubbing systems.

BACKGROUND OF THE INVENTION

The problems of corrosion and scale formation and attendant effects have troubled water systems for years. For instance, scale tends to accumulate on internal walls of various water systems, such as boilers and cooling systems and thereby materially lessen the operational efficiency of the system.

Deposits in lines, heat exchange equipment, etc., may originate from several causes. For example, precipitation of calcium carbonate, calcium sulfate and calcium phosphate in the water system leads to an accumulation of the scale imparting compounds along or around the metal surfaces which contact the flowing water circulating through the system. In this manner, heat transfer functions of the particular system are severely impeded.

Corrosion, on the other hand, is a degrative electrochemical reaction of a metal with its environment. Simply stated, it is the reversion of refined metals to their natural state. For example, iron ore is iron oxide. Iron oxide is refined into steel. When the steel corrodes, it forms iron oxide, which, if unattended, may result in failure or destruction of the metal causing the particular water system to be shut down until the necessary repairs can be made.

Typically, in cooling water systems, the formation of calcium sulfate, calcium phosphate and calcium carbonate, among others, has proven deleterious to the overall efficiency of the cooling water system. Recently, due to the popularity of cooling treatments using high levels of orthophosphate to promote passivation of the metal surfaces in contact with the system water, it has become critically important to control calcium phosphate crystallization so that relatively high levels of orthophosphate may be maintained in the system to achieve the desired passivation without resulting in fouling or impeding heat transfer functions which would normally be caused by calcium phosphate deposition.

Although steam generating systems are somewhat different from cooling water systems, they share a common problem in regard to deposit formation.

As detailed in the Betz Handbook of Industrial Water Conditioning, 8th Edition, 1980, Betz Laboratories, Inc., Trevose, Pa., pages 85–96, the formation of scale and sludge deposits on boiler heating surfaces is a serious problem encountered in steam generation. Although current industrial steam producing systems make use of sophisticated external treatments of the boiler feedwater, e.g., coagulation, filtration, softening of water prior to its feed into the boiler system, these operations are only moderately effective. In all cases, external treatment does not in itself provide adequate treatment since muds, sludge, silts and hardness imparting ions escape the treatment and eventually are introduced into the steam generating system.

In addition to the problems caused by mud, sludge or silts, the industry has also had to can lend with boiler scale. Although external treatment is utilized specifically in an attempt to remove calcium and magnesium from the feedwater, scale formation due to residual hardness, i.e. calcium and magnesium salts, is always experienced. Accordingly, internal treatment, i.e., treatment of the water fed to the system, is necessary to prevent, reduce and/or retard formation of the scale imparting compounds and their resultant deposition. The carbonates of magnesium and calcium are not the only problem compounds as regards scale, but also waters having high contents of phosphate, sulfate and silicate ions, either occurring naturally or added for other purposes cause problems since calcium and magnesium and any iron or copper present react with each and deposit as boiler scale. As is obvious, the deposition of scale on the structural parts of a steam generating system causes poorer circulation and lower heat transfer capacity, resulting accordingly in an overall loss in efficiency.

DETAILED DESCRIPTION OF THE PREFERRED EMBODIMENTS

In accordance with the present invention, new water soluble terpolymers, as shown in Formula II hereinafter, have been discovered which are effective in controlling the formation of mineral deposits and inhibiting corrosion in various aqueous systems.

The water soluble terpolymers of the present invention incorporate novel macromonomers of poly[oxy-[(hydroxymethyl)-1,2-ethanediyl]] of the general structure:

Formula I wherein $R^1$ is a hydrogen or a lower ($C_1$–$C_3$) alkyl; $R^2$ is —$CH_2$—O— or —C(=O)—O—; $R^3$ is —[—$CH_2$—CH(—$CH_2$—OH)—O—]$_n$; n is an integer greater than 1; and $R^4$ is hydrogen, or C1–C20 alkyl. In a preferred embodiment of the invention the macromonomer of Formula I is described as follows: $R^1$ is hydrogen; $R^2$ is —$CH_2$—O—; $R^3$ is —[—$CH_2$—CH(—$CH_2$—OH)—O—]$_n$; n is an integer greater than 5; and $R^4$ is hydrogen, i.e., poly[oxy-[(hydroxymethyl)-1,2-ethanediyl]], α-(2-propenyl)-ω-hydroxy.

The poly[oxy-[(hydroxymethyl)-1,2-ethanediyl]] macromonomers of the present invention can be prepared by the ring opening polymerization of glycidol in the presence of an initiating species containing an α,β ethylenically unsaturated functionality. Exemplary α, β ethylenically unsaturated compounds suitable for the preparation of the macromonomer are well known to those skilled in the art and include, but are not limited to, allyl alcohol, acrylic acid, methacrylic acid, and allyl amines. It is appreciated that the polymerization of glycidol can result in a structure for the repeat unit of $R^3$ of Formula I represented by —[—$CH_2$—CH(OH—)—$CH_2$—O—]$_n$.

The general structure of the water soluble polymers of the present invention is as follows:

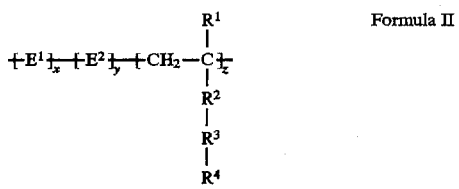

Formula II wherein $E^1$ comprises the repeat unit obtained after polymerization of an $\alpha,\beta$ ethylenically unsaturated monomers, preferably a carboxylic acid, lower alkyl ($C_1$–$C_6$) ester or a hydroxylated lower alkyl ($C_1$–$C_6$) ester of such carboxylic acid, or amide forms thereof; $E^2$ comprises the repeat unit obtained after polymerization of one or more $\alpha$, $\beta$ ethylenically unsaturated monomer containing a sulfonic acid functionality; $R^1$ is a hydrogen or a lower ($C_1$–$C_3$) alkyl; $R^2$ is —$CH_2$—O— or —C(=O)—O—; $R^3$ is —[—$CH_2$—CH(—$CH_2$—OH)—O—]—$_n$; n is an integer greater than 1; and $R^4$ is hydrogen, or C1–C20 alkyl; and x is the molar percentage being between 1–98 molar %, y is the molar percentage being between 1–98 molar %, z is the molar percentage being between 98–1 molar %, wherein the sum of x, y and z equal 100%.

Exemplary compounds encompassed by $E^1$ include, but are not restricted to, the repeat unit formed after polymerization of acrylic acid, methacrylic acid, acrylamide, maleic acid or anhydride, itaconic acid, or 2-hydroxypropyl acrylate and the like. Exemplary compounds encompassed by $E^2$ include, but are not restricted to, the repeat unit formed after polymerization of 2-acrylamido-2-methylpropanesulfonic acid, sodium salt; 1-propanesulfonic acid, 2-hydroxy-3-(2-propenyloxy)-, sodium salt (AHPSE); styrenesulfonic acid, sodium salt; vinylsulfonic acid, sodium salt and the like.

A particularly preferred terpolymer of the present invention [includes] is composed of acrylic acid [/], AHPSE [/], and poly [oxy-[(hydroxymethyl)-1,2-ethanediyl]]$\alpha$-(2 propenyl)-$\omega$-hydroxy (AHGLY$_n$)[ter polymers of] represented by the general formula.

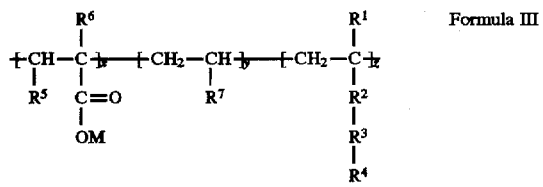

Formula III wherein $E^1$ of Formula II is now represented by the repeat unit obtained after polymerization of acrylic acid ($R^5$=H, $R^6$=H); $E^2$ of Formula II is now represented by the repeat unit obtained after polymerization of AHPSE ($R^7$=$CH_2$—O—$CH_2$—CH(OH)—$CH_2$—$SO_3$M); M is hydrogen or a water soluble cation; $R^1$ is hydrogen; $R^2$ is —$CH_2$—O—; $R^3$ is —[—$CH_2$—CH(—$CH_2$—OH)—O—]$_n$; n is an integer greater than 4; $R^4$ is hydrogen; and x is the molar percentage being between 1–98 molar %, y is the molar percentage being between 1–98 molar %, z is the molar percentage being between 98–1 molar percent, wherein the sum of x, y and z add up to 100%.

The polymers of the present invention should be added to the aqueous system, for which deposit control and corrosion inhibition activities are desired, in an amount effective for the purpose. This amount will vary depending upon the particular system for which treatment is desired and will be influenced by factors such as: the area subject to deposition, pH, temperature, water quantity and the respective concentration in the water of the potential scale and deposit forming species. For the most part, the polymers will be effective when concentration levels are maintained at about 0.1–500 parts per million of water, and preferably from about 1.0–100 parts per million of water in the aqueous system to be treated. The polymers may be added directly into the desired water system in a fixed quantity and in an aqueous solution, continuously or intermittently.

The polymers of the present invention are not limited to use in any specific category of water system. For instance, in addition to boiler and cooling water systems, the polymers may be effectively utilized in gas scrubber systems and the like wherein formation and deposition of scale forming salts is a problem. Other possible environments in which the inventive polymers may be used include heat distribution type sea water desalting apparatus and dust collection systems in iron and steel manufacturing industries and as dispersants in the pulp and paper processing industries. Also the polymers could be used as mineral beneficiation aids such as in iron ore, phosphate, and potash recovery. The polymers may also be effective in deposit control applications where the makeup water contains soluble metal ion species, such as iron, calcium, copper, magnesium or even alum, etc.

The polymers of the present invention may be used in combination with other water treatment agents in order to enhance the corrosion inhibition and scale controlling properties thereof. For instance, the polymers may be used in combination with one or more kinds of compounds (topping agents) selected from the group consisting of inorganic phosphoric acids, phosphonic acid salts, organic phosphoric acid esters, polyvalent metal salts, polymers, azole compounds and mixtures thereof. Such topping components and polymers are readily known to those skilled in the art. For example, details of such compounds are disclosed in U.S. Pat. No. 4,659,481, Chen, and U.S. Pat. No. 5,062,962, Brown et al., both of which are incorporated herein by reference. The topping agents may be added to the system in an amount of from about 1 to 500 parts per million.

EXAMPLES

The present invention will now be further described with reference to a number of specific examples which are to be regarded solely as illustrative, and not restricting the scope of the present invention.

Example 1

Preparation of Poly[oxy-[(hydroxymethyl)-1,2-ethanediyl]]$\alpha$-(2 propenyl)-$\omega$-hydroxy Macromonomer, Degree of Polymerization ~10 (AHGLY$_{10}$)

To a dry reaction flask equipped with a mechanical stirrer, thermometer, reflux condenser, addition port, and nitrogen blanket were charged allyl alcohol (4.1 g, 0.07 mole) and boron trifluoride etherate (0.1g, 0.0007 mole). The solution was heated to 50° C. then glycidol (54 g, 0.7 mole) was charged dropwise over a two hour period. The addition of the glycidol was exothermic and cooling was utilized to maintain the reaction temperature at 53°+3° C. After addition the batch was maintained at 53°±3° C. for two hours. The batch was then cooled to room temperature and diluted with deionized water to yield 116.12 g of a clear colorless solution.

The structure of the desired product was confirmed by $^{13}$C NMR spectroscopy. The spectrum was characterized by peaks at 134.7 (s), 118.5 (s), 76.3–81.6 (m), 67.0–72.6 (m), and the lack of peaks at 44.2 and 52.5 ppm downfield from external dioxane standard. A trace of residual allyl alcohol was also detected.

Example 2

Preparation of Poly[oxy-[(hydroxymethyl)-1,2-ethanediyl]]α-(2 propenyl)-ω-hydroxy Macromonomer, Degree of Polymerization ~5 (AHGLY$_5$)

As in Example 1 except 5.8 g of allyl alcohol (0.1 mole), 0.14 g of boron trifluoride etherate (0.001 mole) and 38.6 g of glycidol (0.5 mole) were utilized.

Example 3

Preparation of Acrylic Acid/AHPSE/AHGLY$_{10}$ Terpolymer, 6:1:1 Molar Ratio

An aliquot of the aqueous macromonomer solution from Example 1 (16.7g, 0.01 mole), a 37% aqueous solution of AHPSE sodium salt (5.9 g, 0.01 mole), isopropyl alcohol (0.5 g, 0.008 mole) and 13 ml of deionized water were charged to a reaction apparatus as described in Example 1. This solution was heated to 80° C. under a nitrogen sparge, then acrylic acid (4.4 g, 0.06 mole) and a 25 wt. % aqueous sodium persulfate solution (2.7 g, 0.0028 mole) were simultaneously charged to the reaction flask over a two hour period at 78°±2° C. The batch was then held at 78°±2° C. for one hour, after which the residual isopropyl alcohol was removed by distillation. The resulting solution was adjusted to pH 5.0 with 50% aqueous sodium hydroxide and the solids were adjusted to ~25 wt. % with deionized water yielding a clear, light yellow-tinted solution. The $^{13}$C NMR spectrum of the final product was free of residual monomer.

A number of other acrylic acid/AHPSE/AHGLY$_n$ terpolymers were prepared according to the procedure of Example 3 and are summarized in Table I.

TABLE I

Acrylic Acid/AHPSE/AHGLY$_n$ Terpolymer Summary

| Example # | Molar Composition | Mole % IPA[1] | % Solids | pH | Viscosity[2] |
|---|---|---|---|---|---|
| 3 | 6 AA/1 AHPSE/1 AHGLY$_{10}$ | 10.0 | 25.4 | 5.0 | 22.2 |
| 4 | 6 AA/1 AHPSE/1 AHGLY$_5$ | 10.0 | 25.5 | 5.0 | 28.3 |
| 5 | 3 AA/1 AHPSE/1 AHGLY$_{10}$ | 10.0 | 25.4 | 5.2 | 10.6 |
| 6 | 3 AA/1 AHPSE/1 AHGLY$_5$ | 10.0 | 24.9 | 5.0 | 12.7 |

[1] Reported as a percentage of the total moles of monomer charged.
[2] Brookfield U.L. viscosity at 25° C.

Deposit Control/Corrosion Inhibition Activity

The polymers of the present invention have been evaluated for their ability to prevent precipitation (i.e., inhibit crystallization) of calcium phosphate. The results shown in Table III are expressed as "percent inhibition". Positive values indicate the stated percentage of precipitate was prevented from being formed.

TABLE II

Calcium Phosphate % Inhibition

Condition A: 1820 ppm Ca$^{2+}$ as CaCO$_3$, 841 ppm Mg$^{2+}$ as CaCO$_3$, 15 ppm PO$_4^{3-}$ pH 8.2, M-alkalinity 12.25 mg/L as CaCO$_3$, 18 Hours, 56° C.

Condition B: 400 ppm Ca$^{2+}$ as CaCO$_3$, 100 ppm Mg$^{2+}$ as CaCO$_3$, 10 ppm PO$_4^{3-}$ pH 8.2, M-alkalinity 50 mg/L as CaCO$_3$, 18 Hours, 70° C.

| Treatment | Test Condition | Treatment Level (ppm actives) 10 | 15 | 20 |
|---|---|---|---|---|
| Example 3 | A | — | 43.66 | 90.86 |
| Example 4 | A | — | 38.08 | 97.46 |
| Example 5 | B | 14.53 | — | 86.59 |
| Example 6 | B | 5.42 | — | 88.83 |

The polymers of the present invention were also evaluated for their ability to inhibit mild steel corrosion. The results shown in Table III are expressed as "percent inhibition" as calculated by Equation I. The mpy values of Equation I are the average electrochemical corrosion rate, EC(avg), derived from potentiodynamic polarization resistance measurements obtained during the course of the test.

Equation I $$\% \text{ Corrosion Inhibition} = \frac{(\text{mpy Blank} - \text{mpy Treated})}{\text{mpy Blank}} \times 100$$

Under these test conditions, the water is saturated with respect to calcium carbonate. It is known in the art that a precipitated film of calcium carbonate will inhibit corrosion, resulting in much lower corrosion rates than that resulting from the inhibitors themselves. Therefore, all tests were conducted with a base treatment to inhibit the precipitation of calcium carbonate under the test conditions. The blank run listed in Table III, reported in mpy, includes addition of the base treatment.

TABLE III

Mild Steel Corrosion % Inhibition
Conditions: 250 ppm Ca$^{2+}$ as CaCO$_3$, 125 ppm Mg$^{2+}$ as CaCO$_3$, 10 ppm SiO$_2^{2-}$, 300 ppm Cl$^-$, 200 ppm SO$_4^{2-}$, 600 ppm V CO$_2$ Sparge, pH 8.4, Malk 90–100 mg/L as CaCO$_3$, 18 Hours, 120° F.

| Treatment | ppm Actives | % Inhibition |
|---|---|---|
| Blank | — | 54.5 mpy |
| Example 3 | 40 | 83% |
| Example 4 | 40 | 82% |
| Example 5 | 40 | 64% |
| Example 6 | 40 | 68% |

While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

We claim:

1. A water soluble polymer having the structure:

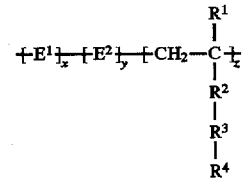

wherein E$^1$ comprises the repeat unit obtained after polymerization of an α, β ethylenically unsaturated carboxylic acid monomer, a lower alkyl (C$_1$–C$_6$) ester or a hydroxylated lower alkyl (C$_1$–C$_6$) ester of such carboxylic acid, or amide forms thereof; E$^2$ comprises the repeat unit obtained after polymerization of an α, β ethylenically unsaturated monomer containing a sulfonic acid functionality, R$^1$ is a hydrogen or a lower (C$_1$–C$_3$) alkyl; R$^2$ is —CH$_2$—O— or —C(=O)—O—; R$^3$ is —[—CH$_2$—CH(—CH$_2$—OH)—O—]—$_n$; n is an integer greater than 1; and R$^4$ is hydrogen, or C1–C20 alkyl; and x is the molar percentage being between 1–98 molar %, y is the molar percentage being between 1–98 molar %, z is the molar percentage being between 1–98 molar %, wherein the sum of x, y and z equal 100%.

2. The water soluble polymer of claim 1 wherein $E^1$ is selected from the group consisting of repeat units formed after polymerization of acrylic acid, methacrylic acid, acrylamide, maleic acid or anhydride, itaconic acid and 2-hydroxypropyl acrylate.

3. The water soluble polymer of claim 1 wherein $E^2$ is selected from the group consisting of repeat units formed after polymerization of 2-acrylamido-2-methylpropane sulfonic acid sodium salt; 1-propane sulfonic acid, 2-hydroxy-3-(2-propenyloxy)-sodium salt; styrene sulfonic acid sodium salt, and vinyl sulfonic acid sodium salt.

* * * * *